US011597523B2

(12) United States Patent
Martino-Gonzalez et al.

(10) Patent No.: US 11,597,523 B2
(45) Date of Patent: Mar. 7, 2023

(54) AIR MANAGEMENT SYSTEM

(71) Applicant: Airbus Operations S.L., Getafe (ES)

(72) Inventors: Esteban Martino-Gonzalez, Getafe (ES); Juan Tomas Prieto Padilla, Getafe (ES)

(73) Assignee: Airbus Operations S.L., Getafe (ES)

( * ) Notice: Subject to any disclaimer, the term of this patent is extended or adjusted under 35 U.S.C. 154(b) by 212 days.

(21) Appl. No.: 16/916,559

(22) Filed: Jun. 30, 2020

(65) Prior Publication Data
US 2021/0001991 A1    Jan. 7, 2021

(30) Foreign Application Priority Data

Jul. 1, 2019   (EP) ..................................... 19382557

(51) Int. Cl.
| *B64D 13/02* | (2006.01) |
| *B64D 13/04* | (2006.01) |
| *B64D 13/06* | (2006.01) |
| B64D 27/12 | (2006.01) |
| B64D 41/00 | (2006.01) |

(52) U.S. Cl.
CPC ............ *B64D 13/02* (2013.01); *B64D 13/06* (2013.01); *B64D 27/12* (2013.01); *B64D 41/007* (2013.01); *B64D 2013/0618* (2013.01)

(58) Field of Classification Search
CPC ........ B64D 13/02; B64D 13/04; B64D 13/06; B64D 2013/0618
USPC .......................................... 454/70–71, 76–77
See application file for complete search history.

(56) References Cited

U.S. PATENT DOCUMENTS

| 6,629,428 | B1 | 10/2003 | Murry | |
| 2002/0113167 | A1* | 8/2002 | Albero | ...................... F02C 7/32 |
| | | | | 244/53 R |
| 2009/0275276 | A1 | 11/2009 | Casado Montero et al. | |
| 2012/0192578 | A1* | 8/2012 | Finney | ................... B64D 13/06 |
| | | | | 62/402 |
| 2013/0061611 | A1 | 3/2013 | Dittmar et al. | |
| 2013/0341465 | A1 | 12/2013 | Mussey et al. | |
| 2016/0177819 | A1 | 6/2016 | Schwarz | |
| 2016/0201983 | A1* | 7/2016 | Sharma | .................. F25J 1/0204 |
| | | | | 95/47 |
| 2016/0214723 | A1* | 7/2016 | Fox | ........................ B64D 13/06 |
| 2017/0268423 | A1 | 9/2017 | Schwarz | |
| 2018/0003072 | A1* | 1/2018 | Lents | ...................... B64D 27/10 |
| 2018/0128178 | A1 | 5/2018 | Snape et al. | |

FOREIGN PATENT DOCUMENTS

| EP | 2272756 A1 | 1/2011 |
| EP | 3219620 A1 | 9/2017 |

OTHER PUBLICATIONS

European Search Report; priority document.

* cited by examiner

*Primary Examiner* — Ko-Wei Lin
(74) *Attorney, Agent, or Firm* — Greer, Burns & Crain, Ltd.

(57) ABSTRACT

An air management system with a set of compressed air sources for supplying pressurized air to air consumer equipment. In particular, either an air bleed system, electrical compressors, or a combination thereof may perform such supplying of compressed air depending on the aircraft operation condition.

11 Claims, 5 Drawing Sheets

AIR MANAGEMENT SYSTEM

CROSS-REFERENCES TO RELATED APPLICATIONS

This application claims the benefit of the European patent application No. 19382557.7 filed on Jul. 1, 2019, the entire disclosures of which are incorporated herein by way of reference.

FIELD OF THE INVENTION

The present invention belongs to the field of pneumatic air distribution systems, and particularly, it relates to the provision of compressed air sources for supplying pressurized air to air consumer equipment.

In particular, either an air bleed system, electrical compressors, or a combination thereof may perform such supplying of compressed air depending on the aircraft operation condition, for instance the flight altitude.

Therefore the air management system of the present invention takes into account flight parameters in order to selectively feed air consumer equipment via any of the above compressed air sources thus avoiding the oversizing of nowadays air management system and consequently minimizing energy loss when operating in non-optimized scenarios.

BACKGROUND OF THE INVENTION

In gas turbine engines, air is normally taken from compressor stages upstream of the fuel-burning chamber(s). Thus, this bleed air is at high temperature and high pressure, wherein typical values are comprised in the range 150-500° C. when extracted from the engine, and in the range 150-250° C. after regulation in a pre-cooler; and 40 psig relative pressure, respectively.

Once taken, this bleed air is channeled from the compressor stages of the engine to various locations within the aircraft by an air management system comprising in turn a network of ducts, valves and regulators. Consequently, such channeling means are to be adapted to withstand the high temperature and pressure of the bleed air.

Because of its high temperature and pressure, this bleeding air is used to operate air consumer equipment such as the Air Cycle Machines of the Environmental Control System (ECS), the Wing Anti-Ice system (WAIS) and other minor air consumers. Depending on the air consumer requirements to be fed, a wide range of pressure and temperature may be needed which entails different energy cost, for instance:

air conditioning (i.e., ECS) is driven by the available pressure, and

WAIS is driven by available temperature.

Classic architectures of air bleed system extract bleed air from the gas turbine compressor at two different stages via respective ports. One of these ports is located at a low-intermediate compressor stage (the so-called Intermediate Port, 'IP') while the second port is located at an intermediate-high compressor stage (the so-called High Port, 'HP') to allow extracting the bleed air at two different conditions.

Typical values of bleed air extracted from each of these ports are:

Intermediate Port, 'IP': pressure from 10 psig ('idling') to 180 psig (maximum take-off thrust, 'MTO'), while temperature is between 80 C° and 400° C.

High Port, 'HP': pressure from 30 psig ('idling') to 650 psig ('MTO'), while temperature is between 150° C. and 650° C.

It is to be noted that the exact value of pressure and temperature of the air bled depends on the engine speed. Similarly, although only two conventional ports have been discussed herein (IP and HP), the High Pressure Port, 'HP', may be formed by more than one port (normally two ports) all located at intermediate-high compressor stages, different from the Intermediate Pressure Port, 'IP'

Hereinafter, for illustrative purposes the possible ports (one or more) forming part of the High Pressure Port will be discussed in conjunction as 'HP'.

Under some circumstances, the channeling means may undergo an unexpected loss of bleed air, the so-called leakages, which could potentially lead to problems when operating the aircraft. Due to its inherent effect in the overall performance, detection means should be installed along the entire route of the channels. Eutectic salt-based sensors are widespread used in the industry as overheat detection sensors for sensing bleed air leakages throughout the ducting.

It is well known in the current practice that air management systems need to install fail-safe architectures such as disperse shut-off valves in order to isolate the different aircraft zone for integrity assurance once ducting leakage is detected. Nevertheless, aircraft vibration may induce rattling on these sensors, which might cause spurious leakage detection alerts and unnecessarily isolation. Besides, spurious faults trigger maintenance actions for leakage localization.

Furthermore, from on-ground to in-flight, external air conditions drastically change. This need to be compensate by the onboard air management system by regulating the air bleeding from each of the two ports (IP or HP ports). Hence, the overall air management system (which exclusively rely on bleed air) must be sized to operate at any planned flight phase, involving a significant energy loss during take-off/climb and descent/holding phases. Hereinafter, details of this energy loss can be seen in FIG. 1.

With the advent of new aircraft models (specifically those Ultra-High By-Pass Ratio engines that provide higher HP port temperatures with lower 'Fan port' pressures), the above problems stress. Consequently, there is a need in the aerospace industry for an air management system that satisfies air consumers requirements with the optimum energy extracted from the gas turbine engines.

SUMMARY OF THE INVENTION

The present invention provides a solution for the aforementioned problems.

In a first inventive aspect, the invention provides an air management system of an aircraft for supplying pressurized air to at least one air consumer, the air management system comprising:

at least one air consumer;

at least one air source;

at least one gas turbine engine having a single port located at a low-intermediate compressor stage of the gas turbine engine;

an air bleed system in fluid communication with the at least one gas turbine engine via the single port of the gas turbine engine, the air bleed system being configured to supply compressed air to the at least one air consumer;

at least one electrical compressor in fluid communication with the air source, the at least one electrical compressor being configured to supply compressed air to the at least one air consumer; and a control unit configured to receive an input relative to the aircraft operation condition and selectively operate the air bleed system and/or the at least one electrical compressor based on the received input.

As it was briefly discussed, an air bleed system comprises a network of ducts and valves configured to convey compressed air from a particular location within the engine compressor (i.e., at a particular compressor stage) for different uses. The temperature and pressure of the air is variable dependent upon the compressor stage at which air is extracted (i.e., air is bled).

In particular, the air bleed system according to the invention comprises a single port configured to extract air from the compressor stage where it is located. Such a single port is located at a low-intermediate compressor stage of the gas turbine engine.

The present invention further envisages the use of at least one electrical compressor in fluid communication with an air source by an inlet. Air is pressurized within the electrical compressor and finally conveyed by the outlet towards the at least one air consumer intended to be fed. In use, a rotating component imparts kinetic energy to the incoming air which is eventually converted into pressure energy, i.e., compressed air.

In operation, that is, the aircraft being either on-ground or in-flight, air with particular pressure, density and temperature surrounds the aircraft ('ambient air'). This mainly depends on the flight altitude or even the flight phase, where air with different properties enters the gas turbine engine and is furthermore affected by the compressor compression.

For a given gas turbine engine, air properties at each compressor stage may be predicted using compressor map, for instance, both at design and off-design conditions.

It is to be noted that the aircraft operation condition can be easily determine by the aircraft itself according to different sensors and electronics installed thereon, being the 'ambient air' different for each flight scenario. Then, the aircraft electronics sends such aircraft operation condition to the control unit of the present invention which processes it and determine which compressed air source need to be operate based on current aircraft operation.

Thus, the control unit selectively operate the air bleed system and/or the at least one electrical compressor via a set of valves (already present or newly introduced) based on such aircraft operation condition ('input') received.

Conventional air management systems relied exclusively on air bleed systems regulating and mixing air extracted from the two ports, i.e., IP and HP, to meet the particular requirements of the air consumers. Unlike this, the present invention provides a hybrid solution that compensates a deletion of the HP (high-pressure port) with electrical compressors.

High energy-demand flight phases of the aircraft encompasses on-ground operation (e.g., taxiing), take-off, or even the first portion of climbing, as well as other phases like descent (or approaching) and holding. Conventionally, in these above energy-demanding flight phases, which represents a little portion of the overall flight, most of bleed air came from the HP since the pressure delivered by the IP port is not sufficient to meet the pressure requirements from the air consumers, which is why the IP port is not used for pressure-related purposes.

For instance, at 'holding' phase where the engine is idling, the IP port is not capable of extracting the bleed air with sufficient pressure, so if energy-demand further increases, it may be necessary to raise the idle, which in turn entails fuel consumption. On the other hand, if air is bled from IP in those phases where the engine is at maximum power, such as take-off, the engine should be sized for more power and therefore would be larger.

As mentioned, using electric compressors (possibly along with batteries) it is possible to accumulate and deliver electricity at the required moment and optimize the size and fuel consumption of the engine.

That is, the air management system utilizes the control unit to select which compressed air source (e.g., air bleed system and/or the at least one electrical compressor) will feed the air consumers.

Accordingly, the conventional HP ducting is deleted. Further, in the absence of an HP bleed source, energy peaks demanded by air consumers are offset by the electrical compressors.

Additionally, the remaining IP may be slightly moved forwards or backwards to optimize the air management system operation at the remaining flight phases (e.g., cruise), which entail the majority of the flight.

The bleed air extracted therein suffices to meet the air consumer requirements during long-term flight phases, such as cruise.

As mentioned, deletion of HP port involves the deletion of the HP ducting. Since the remaining IP line does not convey such a high-pressure and temperature air, there is no need for the related fail-safe equipment such as sensors, valves (e.g., High Pressure Valve, HPV, or Over Pressure Valve, OVP), etc.

In other words, in case there was a leakage in the IP ducting, this air would not jeopardize the structure integrity. Particularly, the air management system according to the invention regulates the channeled air at about 80° C. to 100° C. It is to be noted that current temperature regulation was at above 200° C.

Therefore, a collateral advantage of the invention is that operational safety is enhanced while reliability improved, that is, there is a lower tendency of spurious or real faults triggered by bleed leakages.

In addition, the present air management system advantageously affects the overall aircraft performance in that there is a fuel burn benefit of around 1% Thrust-specific fuel consumption, 'SFC', benefit in a typical short-range aircraft 800 nm (nautical miles) mission profile. The main factor to achieve such a benefit is because the single port is reduced by 2 or 3 stages in comparison with a conventional IP port.

This fuel saving is achieved due to a substantial weight reduction due to HP ducting deletion, OPV and HPV deletion and around 50% pre-cooler size reduction; as well as complete deletion of the APU bleed ducting with the associated OHDS.

In a preferred embodiment, the air bleed system architecture is sized according to cruise phase flight conditions.

In a particular embodiment, the at least one air consumer of the air management system is at least one of the following:

environmental control system;
fuel tank inerting system;
wing anti-ice system;
engine starting system;
water and waste; and/or
hydraulic reservoirs pressurization.

In a preferred embodiment, the environmental control system comprises a vapor cycle machine configured to be operated by the air bleed system and/or the at least one electrical compressor.

Advantageously, vapor cycle machine pack(s) require lower pressure to operate, which better fits with the pressure delivered by the at least one electrical compressors.

Furthermore, along with the reduction of the IP port by 2 or 3 stages in comparison with conventional IP ports, lower pressure requirement of Vapor Cycle Machine packs during cruise conditions allows further improving 'SFC' benefit above 1% in a typical short-range aircraft.

Similarly, other designs adequate to operate at lower pressure may be envisaged within the present invention.

In a particular embodiment, the wing anti-ice system is electrical.

Through compressor stages, temperature increases linearly. Therefore, bleed air from HP was mainly used for high temperature-related purposes.

In the present air management system, maximum extracted flow per engine is significantly lower since electrical WAIS does not require compressed air.

Therefore, electrical WAIS allows better optimization of the air management system due to the lower temperature requirements.

Common electrical WAIS are electro-thermal systems based on resistive circuits generating heat. Heat can be generated either continuously to protect the aircraft from icing ('anti-ice' mode), or intermittently to shed ice as it accretes on certain surfaces ('de-ice').

In a particular embodiment, the air bleed system further comprises a pre-cooler dimensioned to operate with the bleed air extracted from the single port at the compressor stage.

Typical pre-coolers are heat exchangers arranged on the pylon close to the gas turbine engine that provides thermal contact between a duct coming from HP/IP ports, and cooling air coming either coming from a fan port or directly ram air.

As it was already explained hereinbefore, with the advent of Ultra-High By-Pass Ratio engines (that provide higher HP port temperatures and lower fan port pressure), pre-cooler integration in the pylon is becoming challenging due to both the high temperature handled and the lower Fan port pressure which drive a significant size increase.

Advantageously, with the present invention, there is almost a 50% pre-cooler size reduction because of less temperature handled in IP ducts compared with conventional HP ports.

In a preferred embodiment, to meet air consumer requirements with the new air management system architecture, pre-cooler is sized in holding phase when providing air to both the ECS and WAIS.

Holding phase is well-known as a maneuver designed to delay an aircraft already in flight, being kept within a specified airspace at a particular altitude. Therefore, since this phase is the most energy-demanding part of the flight, since altitude is not high enough and speed is relatively low, it is usually taken as a design point for the Environmental Control System.

In a particular embodiment, the at least one electrical compressor is configured to adapt the supplied compressed air according to the flight phase and/or altitude Therefore, the electrical compressor(s) are configured to adapt the pressure delivered (by electrical compressors) to the pressure required (by the air consumer).

In a particular embodiment, the aircraft operation condition is a pre-determined flight altitude and/or the flight phase among the following: taxiing, take-off, climb, cruise, descent, holding, and landing.

In a particular embodiment, the control unit is configured to operate the at least one electrical compressor below a pre-determined flight altitude (for instance, 15000 ft.) and the air bleed system above such pre-determined flight altitude.

In a preferred embodiment, the control unit is configured to selectively operate the air bleed system and/or the at least one electrical compressor depending on the received input, so that:

in taxiing, the at least one electrical compressor supplies compressed air to at least one air consumer;

in taking-off, the at least one electrical compressor supplies compressed air to at least one air consumer;

in climbing, the at least one electrical compressor supplies compressed air to at least one air consumer up to the pre-determined flight altitude, being the pre-determined altitude preferably 15000 ft; then, the air bleed system supplies compressed air to the at least one air consumer;

in cruise, the air bleed system supplies compressed air to at least one air consumer; and in descending, holding, and landing, the at least one electrical compressor supplies compressed air to at least one air consumer.

In other words, the air management system takes benefit of:

the efficiency of the gas turbine engine to provide pressurized air during cruise (or above a certain flight altitude or flight level) with minimum energy loss, and the efficiency of the electrical compressor(s) during ground, early climbing and descent which permit to adapt the pressure delivered by the compressor to the pressure required.

In a particular embodiment, the air bleed system is in fluid communication with each gas turbine engine of the aircraft via respective single ports located at respective compressor stages of each gas turbine engine, and the air management system comprises two electrical compressors.

In a particular embodiment, the at least one electrical compressor is interposed between the air bleed system and the air consumer, so that the air bleed system is the air source of the electrical compressor.

Advantageously, it allows the electrical compressor to compress air coming from air bleed system, increasing the reached pressure.

In an alternative embodiment, electrical compressor(s) is/are installed in parallel to the air bleed system. Therefore, the air source of the electrical compressor may be come either from a fan port or a ram air intake directly connecting with ambient air.

In a particular embodiment, the air management system further comprises an energy storage device configured to supply power to the at least one electrical compressor, such as a battery.

Advantageously, it is not necessary to size the engine at the point requiring maximum energy extraction, as generated energy may be accumulated in part to be used later on in a lower demand.

In a second inventive aspect, the invention provides a method for supplying pressurized air to air consumer equipment, the method comprising:

providing an air management system according to any of the embodiments of the first inventive aspect;

receiving by the control unit an input relative to the aircraft operation condition; and operating the air bleed system and/or the at least one electrical compressor based on the received input.

In a particular embodiment, the method further comprises: operating by the control unit the air bleed system and/or the at least one electrical compressor depending on the received input, so that:

in taxiing, the at least one electrical compressor supplies compressed air to at least one air consumer;

in taking-off, the at least one electrical compressor supplies compressed air to at least one air consumer;

in climbing, the at least one electrical compressor supplies compressed air to at least one air consumer up to the pre-determined altitude, being the pre-determined altitude preferably 15000 ft; then, the air bleed system supplies compressed air to the at least one air consumer;

in cruise, the air bleed system supplies compressed air to at least one air consumer; and in descending, holding, and landing, the at least one electrical compressor supplies compressed air to at least one air consumer.

In a third inventive aspect, the invention provides an aircraft comprising an air management system according to any of the embodiments of the first inventive aspect.

In a fourth inventive aspect, the invention provides a data processing apparatus comprising means for carrying out the method according to any of the embodiments of the second inventive aspect.

In a fifth inventive aspect, the invention provides a computer program comprising instructions which, when the program is executed by a computer, cause the computer to carry out the method according to any of the embodiments of the second inventive aspect.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE PREFERRED EMBODIMENTS

As it will be appreciated by one skilled in the art, aspects of the present invention may be embodied as an air management system, a method, a data processing apparatus, a computer program, or an aircraft.

Figure 1:
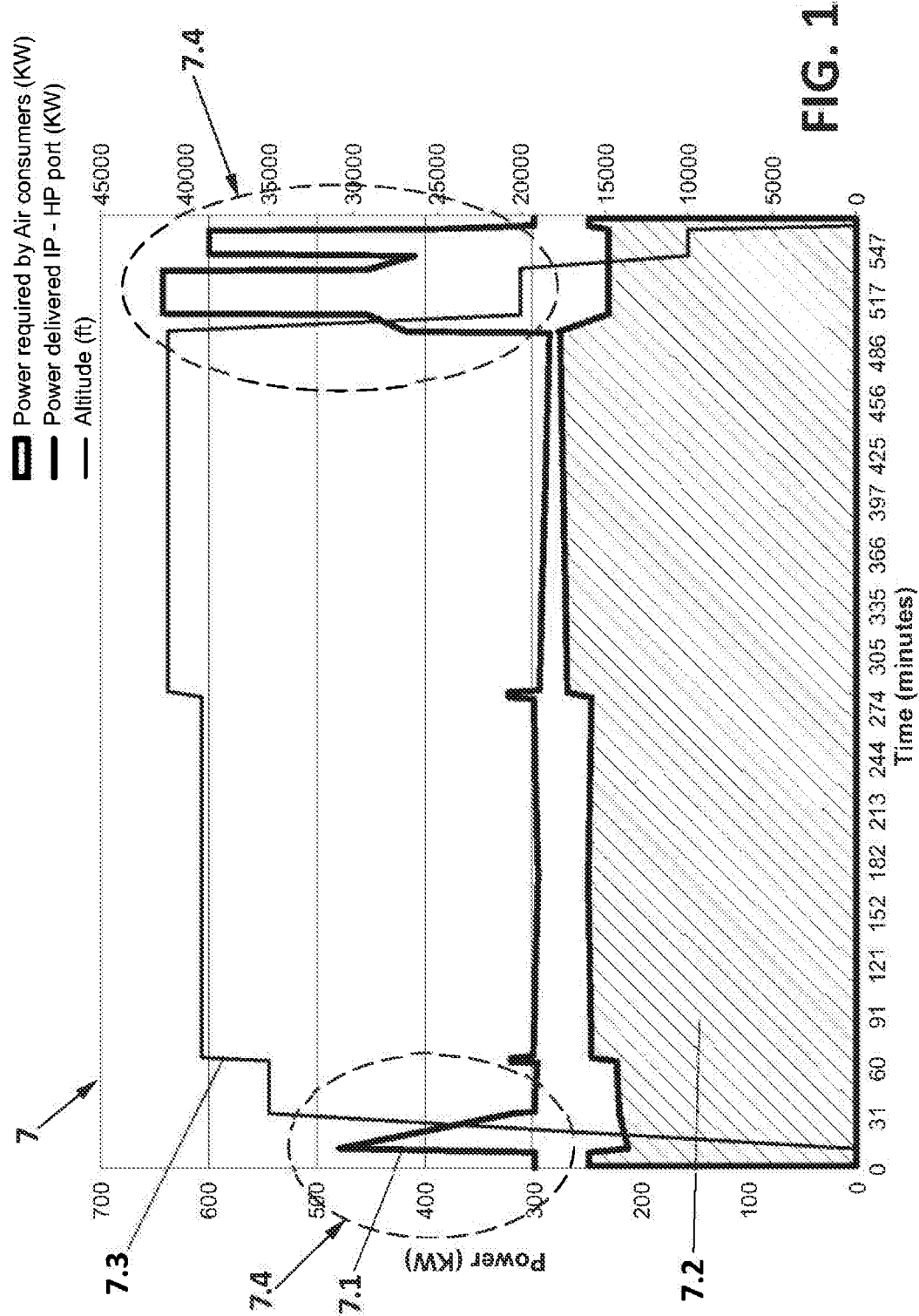
FIG. 1 shows a schematic graph of a conventional IP, HP air bleed system power delivering in comparison with power required by air consumers.

FIG. 1 depicts a schematic graph (7) of a conventional IP-HP air bleed system power delivering (7.1) in comparison with power required (7.2) by air consumers throughout a complete flight.

As it can be seen, it is compared the power required (7.2) by air consumers in kW vs. the power delivered (7.1) by conventional IP-HP air bleed system (in kW). Superimposed on the former, there is an overview of the flight phases (7.3) through which aircraft passes in a complete flight, in particular taking altitude as a reference to place the aircraft in each of such flight phases.

In this exemplary mission profile, there is a mismatch between power supplied by the air bleed system and required by the air consumers both at the beginning and end of the flight, that is, in principle when aircraft is on-ground or close to it below a certain flight altitude.

Left-ordinate axis of the graph indicates power (in kW), while right-ordinate axis indicates flight altitude (in ft.). Finally, abscissa axis refers to flight time (in minutes).

Typical IP-HP air bleed system is conventionally designed as follows:

IP port extracts air during take-off, climbing, cruise, and holding; and

HP port extracts air on-ground, during descent and even holding if IP port is not capable of providing enough air pressure to meet air consumer requirements.

Therefore, in those phases where HP port is extracting air to supply air consumers, there is a significant energy loss as it can be seen by peaks (7.4) in the graph (selected by dashed circles). Those peaks (7.4) represent a power mismatch which entails an energy loss.

This energy loss is because:

on one hand, the energy delivered by the HP port during holding is significantly higher than the energy required by air consumers. HP port is used under these conditions because the energy delivered by the IP port is lower than the energy required; and the energy delivered by the IP port during take-off and early climb phases is significantly higher than the energy required, since the IP port is selected to meet the requirements of the air consumers during cruise. Further, in cruise, the energy extracted from the IP port is lower than during take-off and climbing phases.

Figure 2A:
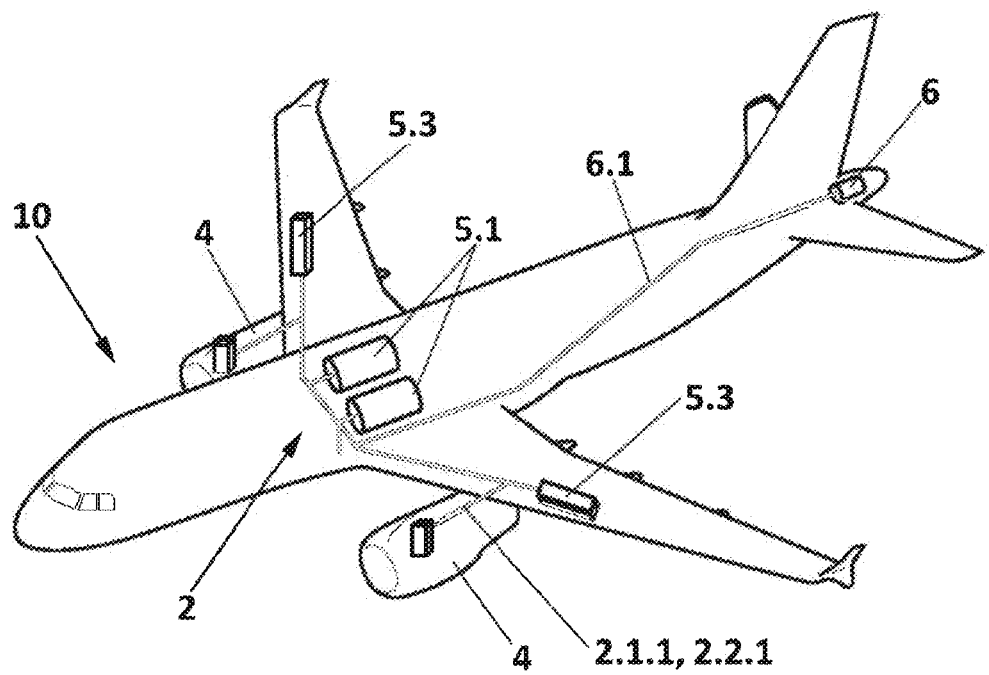
FIGS. 2a-b show a schematic representation of an aircraft comprising (a) a conventional air management system, and (b) an air management system according to the present invention.

FIG. 2a depicts a schematic representation of an aircraft comprising a conventional air management system exclusively based on air bleed system (2).

In particular, the aircraft (10) comprises two gas turbine engines (4) hanging from each wing by respective pylons. It is schematically represented the ducting or channeling from the two ports, IP (2.1) and HP (2.2), coming from different compressor stages of the gas turbine engines (4). It is to be noted that valves, and other hydraulic equipment are not shown in these figures.

It is shown that bleed ports (IP and HP) are in fluid communication (by channels or ducts (2.1.1, 2.2.1)) with WAIS (5.3) and Air Conditioning Packs (5.1) of the ECS in order to convey pressurized air thereto.

Furthermore, the aircraft (10) comprises an Auxiliary Power Unit ('APU') (6) at the tailcone of the aircraft (10). This APU (6) is also in fluid communication (by APU bleed ducting (6.1)) with the WAIS (5.3) and Air Conditioning Packs (5.1) of the ECS in order to provide either pneumatic or electrical energy thereto.

Typical APU bleed ducting (6.1) for pneumatic mode is also associated with OverHeat Detection System for safety reasons.

Figure 2B:
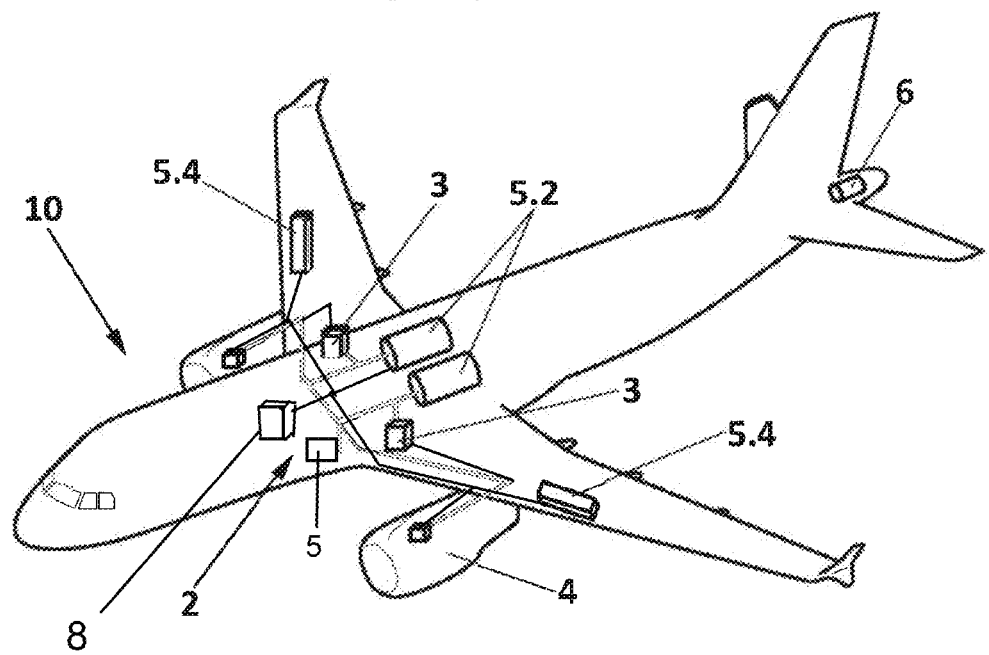

On the other hand, FIG. 2b depicts an example of a schematic representation of a similar aircraft (10) as the one shown in FIG. 2a but comprising an air management system (1) according to the present invention.

Instead of IP-HP port for each gas turbine engine (4) as shown in FIG. 2a, the air bleed system (2) according to the present invention only extracts air from a single port, which is in fluid connection with the Air Conditioning Packs (5.1) of the ECS. In this particular embodiment, the Air Conditioning Packs are replaced by Vapor Cycle Machine Packs (5.2) which need lower air pressure in comparison with conventional Air Conditioning Packs (5.1).

Further, two electrical compressors (3) are positioned within the belly fairing of the aircraft (10) along with the Air Conditioning Packs or Vapor Cycle Machine Packs of the ECS.

In particular embodiments, the wing anti-ice system ('WAIS') may be electrical (5.4) so the ducting for conveying pressured air is no longer needed. Instead, wiring connections (which are lighter than ducts) should be deployed.

Similarly, APU bleed ducting (6.1) is deleted since pneumatic mode is no longer needed. Only electrical mode for supplying power to the electrical compressor (3), for instance, is envisaged. Besides, other power consumers such as batteries, electrical WAIS (5.4), or the like, may be supplied by the APU (6) running in electric mode (or any other electric source).

Deletion of APU bleed ducting (6.1) (that is, APU only works in 'electrical mode') bring the following advantages along:

Significant weight reduction, around 170 kg. (in a short-range aircraft (10)).

Removal of the harmful installation of a high pressure and temperature duct running through the pressurized fuselage.

Deletion of OHDS associated to the APU ducting.

The formerly needed surplus of compressed air provided by the APU (6) is, within the present invention, exclusively provided by the air bleed system (2) through the single port (e.g., IP) after optimization and modelling works. This can be easily done by the person skilled in the art knowing temperature and pressure constraints of the air management system (1) channels, with the aim to meet air consumers (5) requirements acknowledged beforehand.

For example, the combination of electrical WAIS (5.4) and Vapor Cycle Machine Packs (5.2) in the ECS permits reducing by 2 or 3 compressor stages the location of the single port due to low pressure requirement of Vapor Cycle Machine packs above 15000 ft. (8 to 12 psig nominal conditions and up to 14 psig in failure cases).

It is to be noted that, although only WAIS (5.3, 5.4) and ECS (5.1, 5.2) are represented as air consumers (5), other minor air consumers may be used such as: fuel tank inerting system, engine starting system, water and waste, and/or hydraulic reservoirs pressurization.

Also, a control unit (controller (8)) is electrically connected to both the air bleed system (2) and the electrical compressor(s) (3) to selectively operate them based on an aircraft (10) operational condition. In particular, the control unit (8) is electrically connected to some valves of the air bleed system (2) to allow the bleed air coming from the single port either to pass through, or being cut-off, or the flow rate being reduced.

Figure 4:
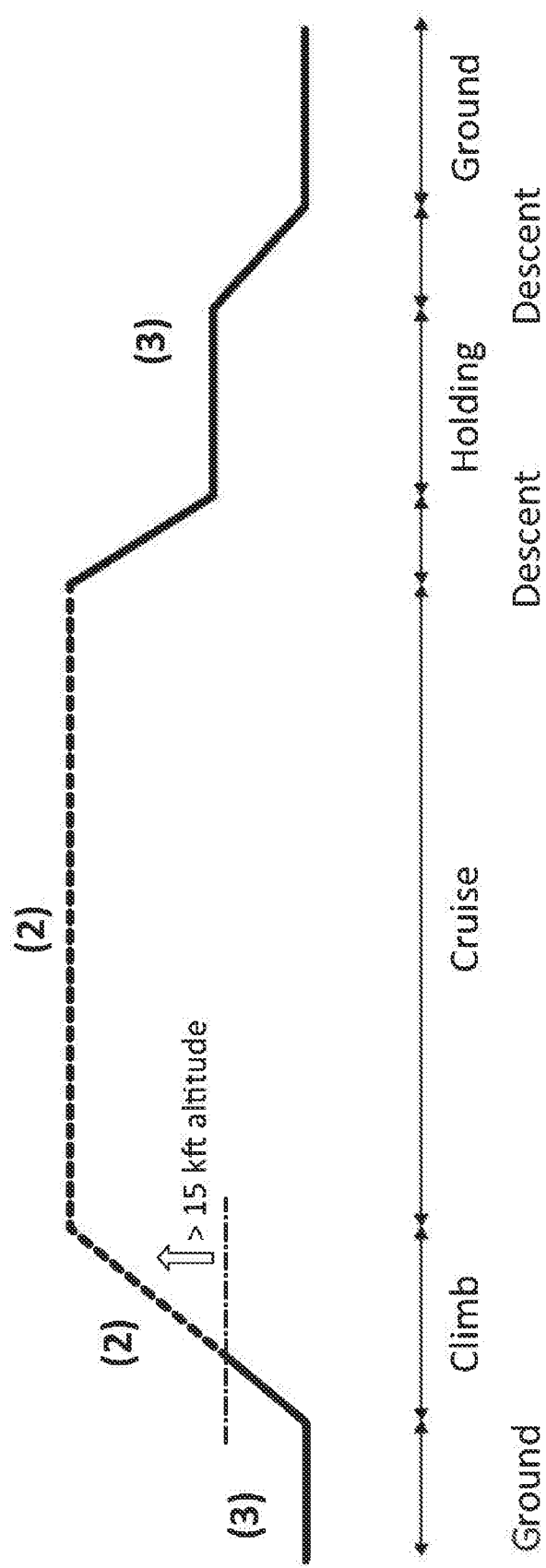
FIG. 4 shows a schematic representation of an aircraft mission profile using an air management system according to the present invention throughout the flight phases.

Particularly, such aircraft (10) operation condition may be a pre-determined flight altitude, for instance 15000 ft., and/or any of the flight phases seen in FIG. 4.

Figure 3A:
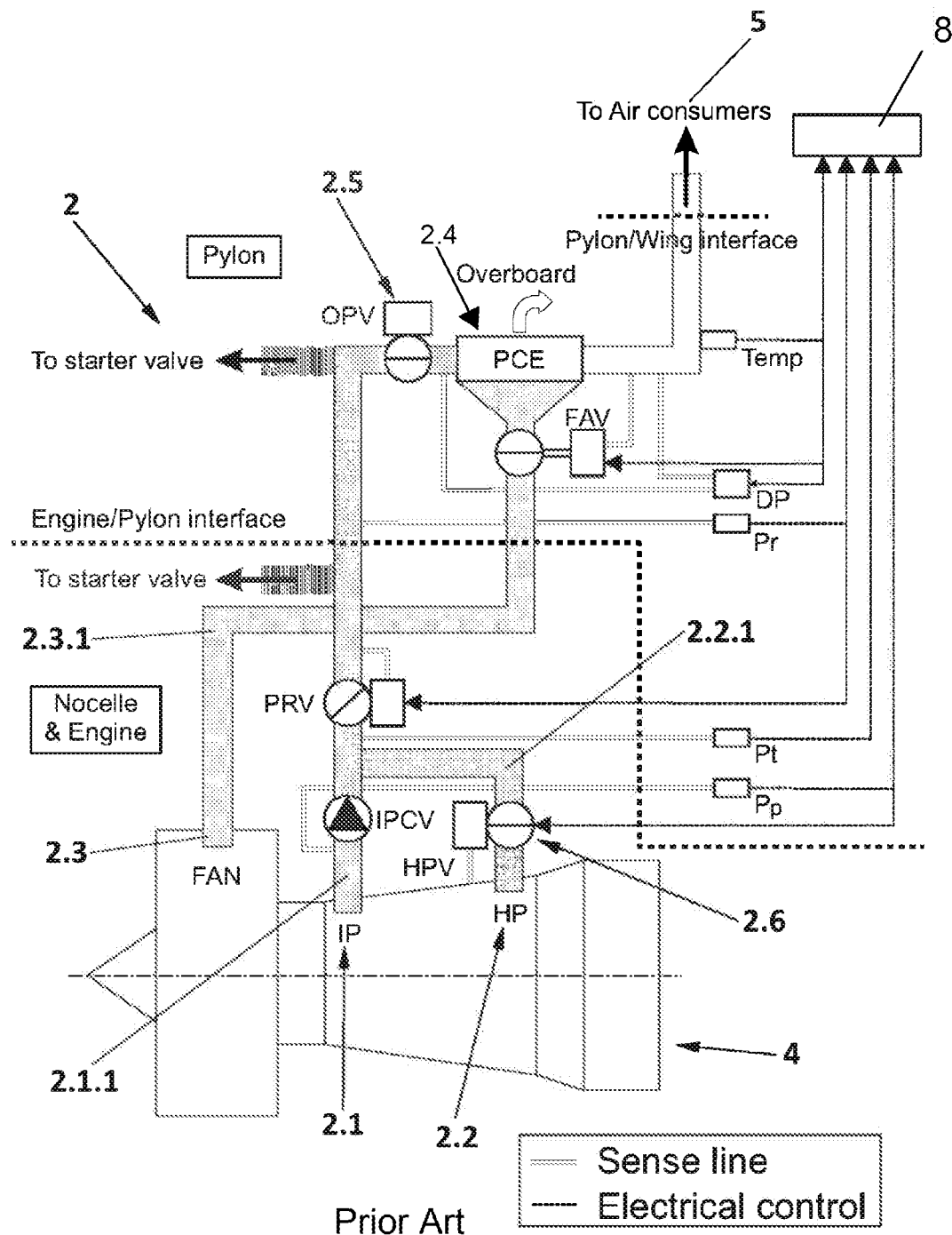
FIGS. 3a-b show a schematic architecture of (a) a conventional air management system, and (b) an air management system according to the present invention.

FIG. 3a depicts a schematic architecture of a conventional air management system (1). In particular, it may be the hydraulic scheme of a portion of the air management system (1) shown in FIG. 2a.

It can be appreciated the two ports, IP (2.1) and HP (2.2), coming from the compressor stage of the gas turbine engine (4). Additionally, there is a third port (2.3) in fluid communication with the fan, specifically design to extract cooling air therefrom and direct it to a pre-cooler (2.4).

This pre-cooler (2.4) is designed to operate with the bleed air extracted from any of the two ports (IP and HP) at respective compressor stages. Therefore, since bleed air extracted from HP (2.2) has higher pressure and temperature, the pre-cooler (2.4) has bigger size to increase the cooling effect. Pre-coolers are normally integrated within the pylon.

Alternatively, cooling air may directly come from ram air instead from fan port (2.3).

It can be seen also the valves, regulators, and other hydraulic components which forms the air management system (1) of the aircraft (10). For instance, there is a overpressure valve ('OPV') (2.5), also named as relief valves, or High Pressure Valve ('HPV') (2.6) whose function is to maintain the pressurized air conveyed through ducting (2.2.1) at an admissible pressure and temperature.

Figure 3B:
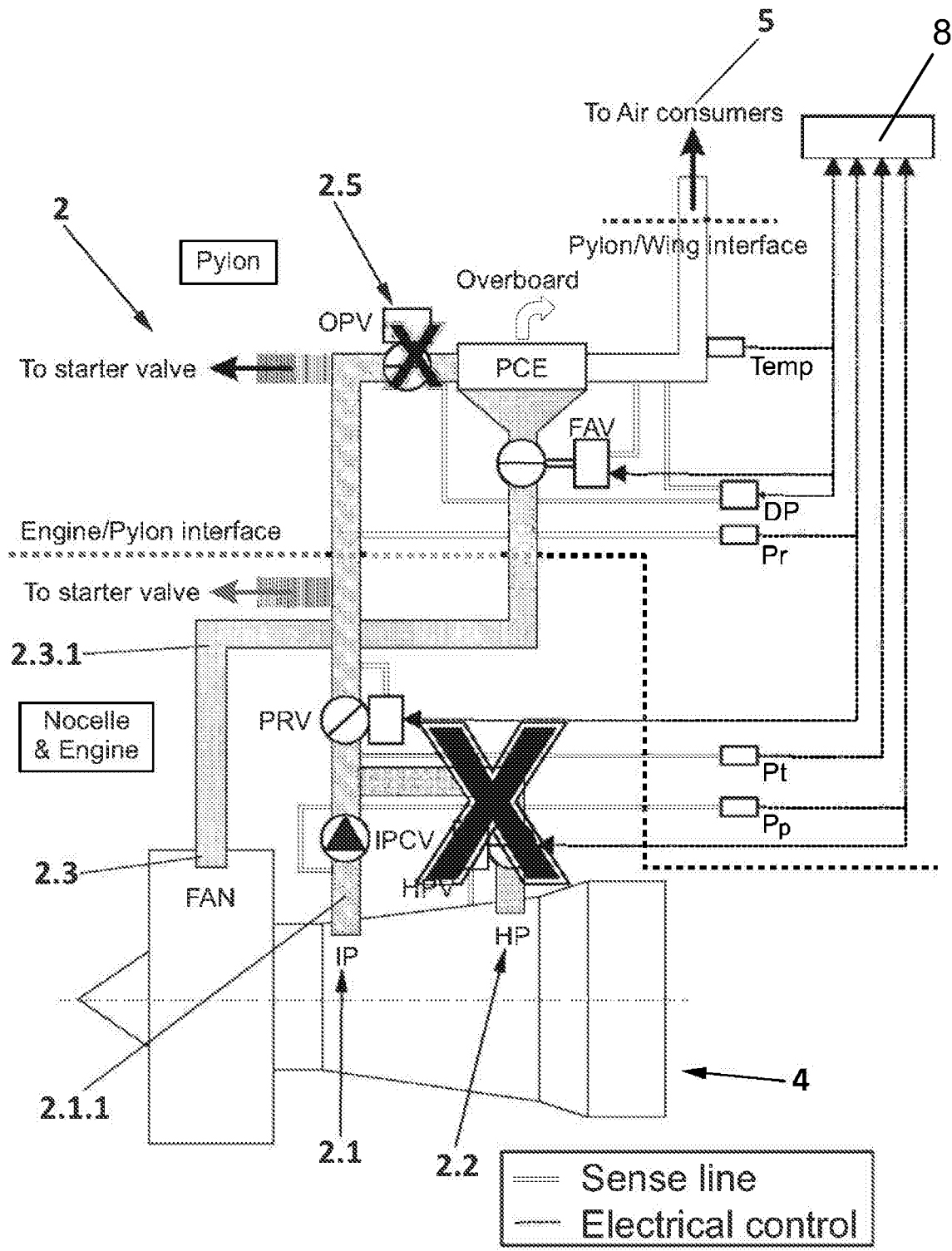

FIG. 3b depicts a schematic architecture of an air management system (1) according to the present invention. As an example, it may form the pneumatic scheme of a portion of the air management system (1) shown in FIG. 2b.

In comparison with the conventional hydraulic scheme of FIG. 3a, the pneumatic scheme of an air management system (1) according to the present invention is substantially similar in lay-out, but HP ducting (2.2.1) sections and related valves (2.2, 2.5, 2.6) are no longer shown. These deleted elements are shown struck through.

In particular, HP port (2.2) (that is, the port located at a higher compressor stage) is deleted. The associated High Pressure Valve (HPV) (2.6) has been also deleted since the air extracted from the remaining IP port (2.1) does not reach such a high temperature and pressure.

Air extracted from the remaining IP port (2.1) is controlled via the Pressure Regulating Valve ('PRV').

The valve ('IPCV') interposed between IP port and the joining point where formerly IP ducting and HP ducting were brought together (to avoid, inter alia, reverse flow) is still of application to shut-off the flow of extracted air form remaining IP port (2.1). Nevertheless, in particular embodiments, IPCV may be deleted as there is no risk of reverse flow in the IP port of air coming from the HP port as prior art pneumatic schemes do.

Further, former Over-Pressure Valve (2.5) is no longer needed as maximum IP port pressure remains below 90 psig within the present invention.

Only one port, IP port (2.1) coming from the compressor stage of the gas turbine engine is appreciated. Additionally, there is a third port (2.3) in fluid communication with the fan, specifically designed to extract cooling air therefrom and direct it to a pre-cooler (2.4).

Since air reaching the pre-cooler (2.4) from the hot side (that is, from the IP duct) is not as hot as with the conventional HP port (2.2) of the air bleed system, pre-cooler is specifically designed to operate with the bleed air extracted from the single port (i.e., the IP port). This entails a pre-cooler size reduction of about 50%.

Once the IP compressed air has been cooled down in the pre-cooler, it is directed to the air consumers (5) as the arrow points out.

It is to be noted that the present air management system (1) regulates conveyed air at around 80° C.-100° C. contrary to nowadays temperature regulation (IP-HP bleed systems) at 200° C.

Further, single port (2.1) (IP port) location is reduced by 2-3 stages because low pressure requirement of Vapor Cycle Machine Packs (5.2) above 15000 ft., although not shown herein for illustrative purposes.

The present invention further provides a method for supplying pressurized air to the air consumer (5) equipment. Briefly, the steps of the method are as follows:

providing an air management system (1) as described hereinabove;

receiving by the control unit (controller (8)) an input relative to the aircraft (10) operation condition; and operating the air bleed system (2) and/or the at least one electrical compressor (3) based on the received input.

FIG. 4 depicts an exemplary aircraft (10) mission profile using an air management system (1) according to the present invention throughout the flight phases.

If the at least one electrical compressor (3) supplies compressed air to at least one air consumer (5), it is represented in a continuous line. On the other hand, when the air bleed system (2) exclusively supplies compressed air to the at least one air consumer; it is represented in a dashed line.

It is to be noted that, for illustrative purposes, no overlap between operation of the air bleed system (2) and operation of the at least one electrical compressor (3) is shown, but this situation of overlap is of interest at the interphase when compressed air source (2, 3) switches.

In particular, the criteria follow by the control unit (8) to operate the air bleed system (2) and/or the at least one electrical compressor (3) upon receiving an aircraft (10) operation condition (i.e., flight altitude or flight phase) is summarized as follows:

Below a pre-determined altitude, preferably 15000 ft.:

in taxiing, the at least one electrical compressor (3) supplies compressed air to at least one air consumer (5);

in taking-off, the at least one electrical compressor (3) supplies compressed air to at least one air consumer (5);

in climbing, the at least one electrical compressor (3) supplies compressed air to at least one air consumer (5) up to the pre-determined altitude;

Above the pre-determined altitude:

still in climbing, the air bleed system (2) exclusively supplies compressed air to the at least one air consumer (5);

in cruise, the air bleed system (2) supplies compressed air to at least one air consumer (5); and Once cruise phase ends:

in descending, holding, and landing, the at least one electrical compressor (3) supplies compressed air to at least one air consumer (5).

In other words, as the aircraft (10) passes from one phase to another, the control unit (8) receives the corresponding input and operates the corresponding compressed air source (bleed air system (2) and/or electrical compressor (3)) via the corresponding valves or directly by the electrical compressor.

As it was already mentioned, since air bleed system (2) exclusively operates in favorable conditions from energy cost point of view (high altitude and relative high speed), the air bleed system (2) architecture is sized according to cruise phase flight conditions, which encompasses the majority of the flight.

Energy-demanding flight phases such as on-ground operation, take-off, or even the first portion of climbing, as well as other phases like descent (or approaching) and holding relies exclusively in pressurized air supplied by the electrical compressor(s).

Therefore, the electrical compressor(s) (3) adapts the delivered pressure to the required pressure by the air consumer (5) upon indication from the control unit (8).

Throughout the entire description, the person skilled in the art would recognize that specific figures of aircraft (10) operation, or parameters of air bleed systems highly depend on specifics of the aircraft (10) model.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for supplying pressurized air to air consumer equipment, the method comprising:
   providing an air management system comprising:
      at least one air consumer;
      at least one air source;
      at least one gas turbine engine having a single bleed air port, the single bleed air port located at a low-intermediate compressor stage of the at least one gas turbine engine;
      an air bleed system in fluid communication with the at least one gas turbine engine via the single bleed air port of the at least one gas turbine engine, the air bleed system being configured to supply compressed air to the at least one air consumer;
      at least one electrical compressor in fluid communication with the at least one air source, the at least one electrical compressor being configured to supply compressed air to the at least one air consumer; and
      a controller configured to receive an input relative to an aircraft operation condition and selectively operate at least one of the air bleed system and the at least one electrical compressor based on the received input;
   receiving by the controller the input relative to the aircraft operation condition;
   operating at least one of the air bleed system and the at least one electrical compressor based on the received input; and
   operating by the controller at least one of the air bleed system and the at least one electrical compressor, depending on the received input, so that:
      in taxiing, the at least one electrical compressor supplies the compressed air to the at least one air consumer;
      in taking-off, the at least one electrical compressor supplies the compressed air to the at least one air consumer;
      in the climb, the at least one electrical compressor supplies the compressed air to the at least one air consumer up to the pre-determined altitude; then, the air bleed system supplies the compressed air to the at least one air consumer;

in the cruise, the air bleed system supplies the compressed air to the at least one air consumer; and in descent, holding, and landing, the at least one electrical compressor supplies the compressed air to the at least one air consumer.

2. The method according to claim 1, wherein the at least one air consumer of the air management system is at least one of the following:

an environmental control system;
a fuel tank inerting system;
a wing anti-ice system;
an engine starting system;
a water and waste system; and
hydraulic reservoirs pressurization.

3. An method according to claim 2, wherein the environmental control system comprises a vapor cycle machine configured to be operated by at least one of the air bleed system and the at least one electrical compressor.

4. The method according to claim 2, wherein the wing anti-ice system is electrical.

5. The method according to claim 1, wherein the air bleed system further comprises a pre-cooler dimensioned to operate with bleed air extracted from the single bleed air port at the low-intermediate compressor stage.

6. The method according to claim 1, wherein the aircraft operation condition is at least one of a pre-determined flight altitude and a flight phase among the following: the taxiing, the take-off, the climb, the cruise, the descent, the holding and the landing.

7. The method according to claim 6, wherein an architecture of the air bleed system is sized according to cruise phase flight conditions.

8. The method according to claim 1, wherein the at least one electrical compressor is configured to adapt the supplied compressed air according to at least one of the flight phase and an aircraft flight altitude.

9. The method according to claim 1, wherein the air bleed system is in fluid communication with each of the at least one gas turbine engine of the aircraft via a respective single bleed air port located at a respective low-intermediate compressor stage of each gas turbine engine, and the at least one electrical compressor comprises two electrical compressors.

10. The method according to claim 1, wherein the at least one electrical compressor is interposed between the air bleed system and the at least one air consumer, so that the air bleed system is the air source of the at least one electrical compressor.

11. The method to claim 1, further comprising an energy storage device configured to supply power to the at least one electrical compressor.

* * * * *